(12) United States Patent
Potrebic et al.

(10) Patent No.: US 7,584,497 B2
(45) Date of Patent: Sep. 1, 2009

(54) STRATEGIES FOR SCHEDULING BANDWIDTH-CONSUMING MEDIA EVENTS

(75) Inventors: Peter J. Potrebic, Calistoga, CA (US); Thomas H. Taylor, Redmond, WA (US); Naga A. K. Pasumarthy, Sunnyvale, CA (US)

(73) Assignee: Microsoft Corporation, Redmond, WA (US)

( * ) Notice: Subject to any disclaimer, the term of this patent is extended or adjusted under 35 U.S.C. 154(b) by 616 days.

(21) Appl. No.: 11/135,994

(22) Filed: May 24, 2005

(65) Prior Publication Data

US 2006/0268099 A1 Nov. 30, 2006

(51) Int. Cl.
H04N 7/173 (2006.01)

(52) U.S. Cl. .............................. 725/116; 725/96; 725/97

(58) Field of Classification Search .................... 725/58, 725/93, 95–97, 116; 386/83
See application file for complete search history.

(56) References Cited

U.S. PATENT DOCUMENTS

| | | | |
|---|---|---|---|
| 5,666,645 | A | 9/1997 | Thomas et al. |
| 5,841,433 | A | 11/1998 | Chaney |
| 6,177,931 | B1 | 1/2001 | Alexander et al. |
| 6,665,869 | B1 | 12/2003 | Ellis et al. |
| 6,798,971 | B2 | 9/2004 | Potrebic |
| 6,804,824 | B1 | 10/2004 | Potrebic et al. |
| 6,897,904 | B2 | 5/2005 | Potrebic et al. |
| 7,212,730 | B2 * | 5/2007 | Boston et al. .................. 386/83 |
| 2001/0052130 | A1 | 12/2001 | Yap et al. |
| 2002/0108126 | A1 | 8/2002 | Horowitz et al. |
| 2002/0110352 | A1 | 8/2002 | Potrebic |
| 2002/0110353 | A1 | 8/2002 | Potrebic et al. |
| 2002/0110360 | A1 | 8/2002 | Potrebic |
| 2002/0136538 | A1 * | 9/2002 | Chen .......................... 386/111 |
| 2002/0188944 | A1 | 12/2002 | Noble |
| 2003/0128302 | A1 | 7/2003 | Potrebic et al. |
| 2003/0198461 | A1 | 10/2003 | Taylor et al. |

(Continued)

FOREIGN PATENT DOCUMENTS

JP 2004023326 1/2004

(Continued)

OTHER PUBLICATIONS

"Flex Watch Network Storage Server (NSS-1016)," available at <<http://www.remote-security.com/fwstorage.htm>>, accessed on Dec. 1, 2005, 3 pages.

(Continued)

Primary Examiner—Andrew Y Koenig
Assistant Examiner—Anthony Bantamoi
(74) Attorney, Agent, or Firm—Lee & Hayes, PLLC

(57) ABSTRACT

Scheduling functionality is described for resolving conflicts in the schedules of respective client devices, where the schedules are used to govern the recordation of media programs by the respective client devices. The client devices use virtual tuner functionality to receive media programs over respective communication channels, each channel having a prescribed amount of available bandwidth in which to receive media information. The scheduling functionality includes a conflict identification module for identifying conflicts in the schedules, a solution enumeration module for enumerating solutions to the conflicts, and a conflict resolution module for resolving the conflicts based on the output of the solution enumeration module. In one case, the schedules can be partitioned into a plurality of time segments, and solutions can be enumerated for each time segment in turn.

20 Claims, 9 Drawing Sheets

U.S. PATENT DOCUMENTS

| | | | |
|---|---|---|---|
| 2003/0198462 A1* | 10/2003 | Bumgardner et al. | 386/83 |
| 2003/0204848 A1* | 10/2003 | Cheng et al. | 725/58 |
| 2003/0212708 A1 | 11/2003 | Potrebic et al. | |
| 2004/0078817 A1 | 4/2004 | Horowitz et al. | |
| 2004/0218905 A1* | 11/2004 | Green et al. | 386/83 |
| 2004/0244030 A1 | 12/2004 | Boyce et al. | |
| 2005/0025469 A1 | 2/2005 | Geer et al. | |
| 2005/0073613 A1 | 4/2005 | Potrebic et al. | |
| 2005/0237435 A1 | 10/2005 | Potrebic et al. | |
| 2005/0246738 A1 | 11/2005 | Lockett et al. | |
| 2006/0061682 A1* | 3/2006 | Bradley et al. | 348/441 |
| 2006/0062156 A1* | 3/2006 | Stultz et al. | 370/252 |
| 2006/0104611 A1* | 5/2006 | Gildred et al. | 386/83 |
| 2006/0206912 A1* | 9/2006 | Klarfeld et al. | 725/40 |
| 2006/0263040 A1* | 11/2006 | Mears et al. | 386/83 |

FOREIGN PATENT DOCUMENTS

| | | |
|---|---|---|
| WO | WO 03067594 | 8/2003 |
| WO | WO 2004053842 | 6/2004 |

OTHER PUBLICATIONS

Ochiva, "Potent Storage," available at <<http://www.findarticles.com/p/articles/mi_m0HFE/is_g_30/ai_n6072716/print>>, accessed on Dec. 1, 2005, 4 pages.

"Denon to launch 'Multi-Media Server'," available at <<http://www.pvruk com/2004/06/denon_to_launch.html>>, accessed on Dec. 1, 2005, pp. 2,3 of 4.

"Boundless Security System," available at <<http:www.boundlesss.com/contact.html>>, accessed on Dec. 1, 2005, 1 page.

* cited by examiner

STRATEGIES FOR SCHEDULING BANDWIDTH-CONSUMING MEDIA EVENTS

TECHNICAL FIELD

This subject matter relates to resolving conflicts in schedules. In a more particular implementation, this subject matter relates to strategies for resolving conflicts in schedules that govern the receipt and recordation of media programs by respective client devices.

BACKGROUND

Conventional digital video recorder (DVR) functionality uses a scheduler. A scheduler comprises functionality which coordinates the recordation of media programs. The scheduler performs this task by creating a schedule and then recording media programs identified in the schedule. More specifically, the schedule includes entries which identify the respective media programs. The entries include timing-related information and other data which governs the recording of the corresponding media programs.

Occasionally, a user attempts to add an entry to the schedule which conflicts with one or more pre-existing entries. For example, consider the case in which a client device employs a conventional physical tuner to receive media information from a head-end source. This tuner can only tune to and receive one media program at any given time (e.g., by tuning to a prescribed frequency that carries the media program). Thus, if the user adds an entry to the schedule which identifies a media program which temporally overlaps the airing of another media program, then a conflict is created, because the tuner cannot tune to and receive two media programs at one time. The scheduler can resolve this conflict by alerting the user to the conflict and requesting the user to select either of the conflicting media programs.

A more complex client device can employ multiple physical tuners. This allows the client device to receive multiple media programs at the same time. In one case, these tuners can be implemented as the same kind of unit. In another case, these tuners can be implemented as two or more different kinds of units; for example, a first class of tuners can be used to receive a first kind of media program (such as standard definition media programs), while a second kind of tuner can be used to receive a second kind of media program (such as high definition media programs). Conflict resolution for these types of client devices is more complex than the single-tuner case, but does not fundamentally depart from the basic paradigm used by the single-tuner case. Namely, the scheduler determines whether, at any given time, the client device can provide enough physical tuners to record all of the media programs identified in the schedule. If, at any given time, the number of media programs to be recorded exceeds the number of available tuners, then a conflict exists. The scheduler may attempt to resolve the conflict in the manner specified above, that is, by alerting the user to the conflict and prompting the user to eliminate one or more entries in the schedule to remove the assessed conflicts.

The assignee of the present invention is developing client devices which depart from the traditional model discussed above. A client device of this variety employs virtual tuner functionality. The virtual tuner functionality allocates a variable number of virtual tuners to receive a variable number of digital media programs by "tuning" to these streams in a unicast and/or multicast fashion. For example, suppose that the client device is allocated a total of 6 bandwidth units to receive media information. Further assume that each standard definition media program consumes 1 unit of bandwidth and each high definition media program consumes 2 units of bandwidth. This means that the virtual tuner functionality can employ any combination of standard definition and high definition media programs so long as the total consumed bandwidth does not exceed 6 units. For example, one possibility is that the client device allocates 6 virtual tuners to receive 6 standard definition media programs. Another possibility is that the client device devotes 3 virtual tuners to receive 3 corresponding high definition media programs. Another possibility is that the client device devotes 2 virtual tuners to receive 2 high definition media programs and 2 virtual tuners to receive 2 standard definition media programs, and so forth. Exemplary technology for implementing such a client device is described, for example, in commonly assigned U.S. patent application Ser. No. 11/057,477, entitled, "TUNERLESS MEDIA PRESENTATION UNIT AND METHODS OF USE," naming inventors David L. de Heer et al., filed on Feb. 14, 2005. This patent application is incorporated by reference herein in its entirety.

Conflict resolution is more complex in a client device that employs virtual tuner functionality. This is because the client device is constrained by the total amount of available bandwidth, rather than the total number available physical tuners. This allows for many more degrees of freedom in creating and modifying a schedule compared to the traditional scheduling paradigm described above. For example, any event that consumes a portion of the available bandwidth can potentially cause a conflict in a schedule, and a change made to one part of the schedule can propagate through the schedule, mandating that potentially complex changes be made to other entries in the schedule.

There is therefore an exemplary need in the art to provide conflict resolution strategies for client devices that receive media programs using virtual tuner functionality.

SUMMARY

According to one exemplary aspect, a method is described for resolving schedule conflicts affecting a client device that employs virtual tuner functionality. The method comprises: establishing a schedule that specifies plural media programs; identifying at least one conflict in the schedule caused by at least one bandwidth event; enumerating at least one solution to the aforementioned at least one conflict, wherein the aforementioned at least one solution takes into account: (a) a total amount of bandwidth available to the client device to receive media programs; and (b) an amount of bandwidth consumed by each of the aforementioned plural media programs in the schedule; and resolving the aforementioned at least one conflict based on the aforementioned at least one solution.

According to another exemplary aspect, the above-described identifying of the aforementioned at least one conflict comprises: partitioning the schedule into at least one candidate time segment in which a conflict may exist; and determining at least one conflicting time segment from the aforementioned at least one candidate time segment for which an actual conflict exists. The enumerating of the aforementioned at least one solution comprises enumerating at least one solution that resolves the conflict for each particular time segment in turn in the aforementioned at least one conflicting time segment.

According to another exemplary aspect, a method is described for scheduling the processing of media programs for a client device that employs virtual tuner functionality. The method comprises: identifying at least one bandwidth event that affects the recordation of a set of media programs by the client device; identifying different bandwidth versions of at least one media program in the set of media programs; identifying a user's preferences regarding quality at which media programs are recorded; and providing a schedule which governs the recording of the aforementioned at least one media program based on the identified bandwidth versions and user's preferences, wherein the providing of the schedule comprises resolving at least one conflict in the schedule when such a conflict is determined to exist.

Additional exemplary implementations are described in the following.

Figure 1:
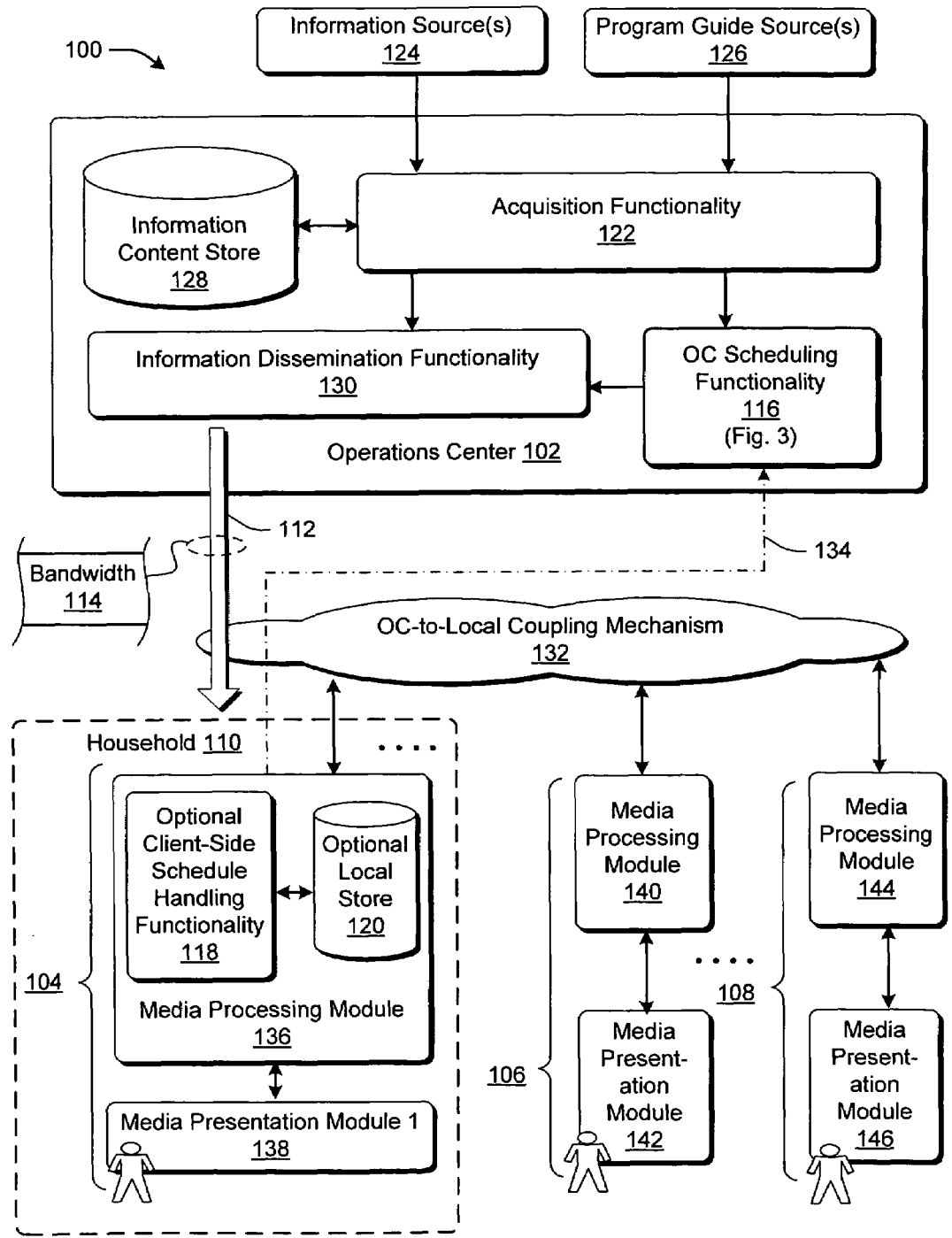
FIG. 1 shows an exemplary system for performing scheduling for client devices which employ virtual tuner functionality.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

The following description sets forth scheduling functionality for scheduling the processing (e.g., recordation) of media programs for a client device that employs virtual tuner functionality. The virtual tuner functionality tunes to one or more media programs in virtual fashion, and can simultaneously consume any number of media programs, providing that the total amount of bandwidth consumed does not exceed a total amount of available bandwidth. In other words, a client device that uses virtual tuner functionality can "carve up" the available bandwidth in a variety of different ways to consume media programs. This capability introduces additional degrees of freedom in constructing schedules, and thus makes the task of scheduling media programs more complex (compared to scheduling performed with respect to a client devices that use a fixed number of physical tuners). The scheduling functionality described herein effectively addresses this added complexity.

As to terminology, the term "media information" refers to any data represented in electronic form that can be consumed by a user. The media information can include any information that conveys audio and/or video information, such as audio resources (e.g., music, spoken word subject matter, etc.), still picture resources (e.g., digital photographs, etc.), moving picture resources (e.g., audio-visual television media programs, movies, etc.), and so on.

The term "media program" represents any unit of media information that can be consumed by a client device. For example, a media program may represent a television media program, a movie, a piece of music, and so forth.

The term "client device" refers to any unit for processing and presenting media information. For example, the client device can comprise a set-top box module, a digital video recorder (DVR), a rewritable digital video disc (DVD-RW) device, a television device with integrated media processing functionality, a computer equipped with media processing functionality, and so forth, or some combination of such devices.

The term "schedule" refers to a collection of entries that specify salient information regarding media programs to be recorded. For example, the entries specify the timing at which media programs will begin and end. The entries may also specify the sources (e.g., channels) that will provide the media programs and other potential characteristics of the media programs. Generally, information presented in the schedule is referred to as "schedule information" herein.

The term "media program guide" refers to master schedule information which defines the timing of media programs delivered by a plurality of different sources (e.g., channels). The term "media program guide information" generally refers to information presented in the media program guide. The media program guide information may comprise electronic media program guide (EPG) information that is updated on a periodic basis.

This disclosure includes the following sections. Section A explains an exemplary system for implementing the schedule functionality. And section B presents flowcharts and accompanying examples that illustrate the operation of the system of section A.

A. Exemplary System (FIGS. 1-4)

Generally, any of the functions described with reference to the figures can be implemented using software, firmware (e.g., fixed logic circuitry), manual processing, or a combination of these implementations. The term "logic, "module" or "functionality" as used herein generally represents software, firmware, or a combination of software and firmware. For instance, in the case of a software implementation, the term "logic," "module," or "functionality" represents media program code (and/or declarative-type instructions) that performs specified tasks when executed on a processing device or devices (e.g., CPU or CPUs). The media program code can be stored in one or more computer readable memory devices. More generally, the illustrated separation of logic, modules and functionality into distinct units may reflect an actual physical grouping and allocation of such software and/or hardware, or can correspond to a conceptual allocation of different tasks performed by a single software media program and/or hardware unit. The illustrated logic, modules and functionality can be located at a single site (e.g., as implemented by a processing device), or can be distributed over plural locations.

A.1. Overview of the Exemplary Design Paradigm (FIG. 1)

FIG. 1 shows a system 100 in which a head-end operations center (OC) 102 delivers media programs to a plurality of client devices (104, 106, . . . 108). The representative client device 104 is located in a household 110. The household 110 can potentially include additional client devices (not shown). For example, the household 110 can potentially include different client devices located in different respective rooms of the household 110. In the following discussion, the features of the invention will be described with respect to the representative client device 104 located in household 110; but the identified features apply with equal force to other client devices and households.

The operation center 102 uses a communication channel ("channel") 112 to deliver media information to the exemplary household 110. The channel 112 includes a prescribed amount of bandwidth 114 for streaming media information to the household 114. The term "bandwidth" refers to the amount of information that can be transmitted over the channel 112 in a given amount of time. In one case, the operations center 102 transmits information over the channel 112 at a constant data rate equal to the bandwidth 114. In another case, the operations center 102 transmits information over the channel 112 at a variable rate which is capped by the bandwidth 114. In any case, the channel 112 can be metaphorically viewed as a communications pipe having a "diameter" defined by the bandwidth 114, which controls the maximum amount of information that can flow through the pipe at any given time.

The bandwidth 114 can accommodate the delivery of plural identified streams of media information to the household 110. This enables a single client device 104 to potentially extract multiple streams of media information using the channel 112 for simultaneous presentation thereat. This, in turn, enables the user to watch or record plural media programs at the same time. In another case, the communication channel 112 can provide plural streams for reception by different client devices within the household 110 which "feed" off the same channel 112.

The simplifying assumption is made in this disclosure that the bandwidth 114 remains substantially constant. However, the scheduling algorithms described herein can also be applied to the case where the bandwidth 114 varies over time. For example, the scheduling algorithms can be applied to the case where the bandwidth 114 is set at a first level at certain times of the day, and at a second level at other times of the day. Many other variable bandwidth scenarios are possible. In these cases, the scheduling algorithms determine the available bandwidth during the airing of future programs, and take this factor into account when scheduling the programs.

A further simplifying assumption is made in this disclosure that the bandwidth consumed by any program remains substantially constant, e.g., at a standard definition constant level, a high definition constant level, and so forth. However, the scheduling algorithms described herein can also be applied to the case where the amount of bandwidth consumed by a program varies over the course of the program. The scheduling algorithms can take this additional factor into account when scheduling these kinds of programs.

The client device 104 employs virtual tuner functionality (not shown) to receive media programs from the channel 112. For example, assume that the operations center 102 provides the media information via a multicast technique, such as the Internet Group Management Protocol (IGMP). In the IGMP technique, a source of media information disseminates the media information to a group of recipients using a tree of distribution nodes. In this case, the virtual tuner functionality can "tune to" a media program by tapping into that multicast distribution of the media program; it can perform this task by locating an appropriate distribution node within the tree of such nodes. Alternatively, assume that the operations center 102 provides the media information via a unicast technique. In the unicast technique, a source of media information provides a targeted dissemination of the media information to a recipient in one-to-one fashion. In this case, the virtual tuner functionality can "tune to" the media program by identifying the source that provides the media program (which may correspond, for example, to a server machine provided by the operations center 102). In still other cases, the virtual tuner functionality may use a combination of multicast and unicast techniques, or some other technique or techniques.

The virtual tuner functionality can apply different instances of its functionality to receive different media programs. In the terminology used herein, such separate instances constitute separate "virtual tuners." The virtual tuners differ from conventional physical tuners in various respects. For instance, the virtual tuners "tune to" media programs by logically identifying a source which distributes such media programs (in the manner described above). In contrast, physical tuners tune to media programs by typically locking onto a frequency which modulates the media programs. Moreover, the virtual tuner functionality can support any number of virtual tuners (so long as the aggregate amount of bandwidth consumed by the virtual tuners does not exceed the total amount of allocated bandwidth 114). In contrast, physical tuners represent discrete hardware units; accordingly, a traditional client device provides a fixed number of such units that cannot be varied without physically adding (or removing) units. The virtual tuner functionality is qualified as being "virtual" for the very reasons set forth above.

A more detailed explication of the characteristics of the virtual tuner functionality follows.

Assume that the communication channel 112 provides a bandwidth 114 of N units. Assume further that a media program can be provided in different recording qualities, such as a standard definition (SD) recording quality and a high definition (HD) recording quality. An SD stream consumes $S_{SD}$ units of bandwidth and an HD stream consumes $S_{HD}$ units of bandwidth, where $S_{SD}<S_{HD}$. Another potential format is the picture-in-picture (PIP) format, which comprises a thumbnail version of the stream, where $S_{PIP}<S_{SD}$. In the simplified case in which the client device 104 receives only SD streams, then the channel 112 can support T virtual tuners:

$$T=N/S_{SD}.$$

Or expressed another way:

$$K(S_{SD}) \leq N.$$

This expression indicates that a number K of SD streams must, in the aggregate, consume less than the total N amount of available bandwidth 114.

In the more general case in which the client device 104 can receive streams that consume an arbitrary amount of bandwidth $S_i$, the following expression must hold true at is all times.

$$\sum_{i=1}^{K} S_i \leq N.$$

In other words, the aggregate amount of bandwidth consumed by the received streams must be less than the total N amount of available bandwidth 114. For example, consider the exemplary case in which the client device 114 receives a number L of SD streams that each consumes $S_{SD}$ units of bandwidth and a number J of HD streams that each consumes $S_{HD}$ units of bandwidth. The above-identified constraint becomes:

$$L*S_{SD}+J*S_{HD} \leq N.$$

The above-described equations represent approximations. In an actual application, the system 100 can use a portion of its bandwidth 114 to handle other tasks besides the principal streaming of media programs. For example, the system 100 can use a portion of the bandwidth to handle retry activity which supplies missed packets to the client device 104. As will be described below, there are other potential "drains" on the available bandwidth. For example, an entity (such as a personal computer) that is coupled to the channel 112 can consume portions of the bandwidth 114, e.g., by downloading music from the Internet, uploading pictures to a website, receiving and/or sending Email, and so forth. This consumed bandwidth reduces the amount of total bandwidth available to receive media programs, and thus affects the scheduling of the programs.

The system 100 provides scheduling functionality that uses the above-described constraints when it schedules the recordation of media programs for consumption by the client device 104. In one case, the scheduling functionality can be implemented at the operations center 102 as OC scheduling functionality 116. In this implementation, the OC scheduling functionality 116 maintains schedules for all of the client devices (104, 106, . . . 108) at the operations center 102 site. In another case, the scheduling functionality can be implemented as client-side schedule handling functionality 118 that is located at the representative client device 104. (As mentioned above, this discussion will focus on representative client device 104; but other client devices can implement their own respective client-side schedule handling functionality, and what is set forth with respect to client device 104 applies to other client devices with equal force.) In still another case, the scheduling functionality can be implemented in distributed fashion by a combination of functionality provided at the operations center 102 and the client device 104. To facilitate discussion, and to provide one concrete example, the remainder of the discussion will assume that the core of the scheduling functionality is implemented at the operations center 102 by the OC scheduling functionality 116.

The purpose of the scheduling functionality 116—with respect to representative client device 104—is to maintain a schedule for the client device 104 that determines the timing at which the client device 104 should record media programs provided by the operations center 102. To perform in this manner, the user of the client device 104 can forward scheduling instructions to the scheduling functionality 116 to create a schedule. The scheduling functionality 116 can then, in turn, send down recording instructions to the client device 104 when the schedule indicates that it is time to record the media programs identified in the schedule. The client device 104 then proceeds to record the identified media programs in a local store 120.

In other implementations, the schedule can be used to determine the streaming of one or media programs to the client device 104 without necessarily requiring the recordation of these media programs at the client device 104. In other words, the schedule may instruct the client device 104 to tune to plural programs at the same time, and the client device 104 can simply present these programs at the same time, e.g., in picture-in-picture fashion or some other fashion (without necessarily recording these programs). Or the client device 104 can record some programs that it receives but not others. Still alternatively, the operations center 102 itself can record the media programs at the operations center 102 in an appropriate media program store (not shown), after which these programs can be streamed to the client device 104 for presentation at the client device 104. However, the last-mentioned scenario eliminates the need for scheduling altogether. This is because, after recording the programs at the operations center 102, there is generally no need to stream multiple programs to the client device 104 at the same time, unless the client device 104 for some reason wants to receive multiple recorded programs at the same time, such as in a picture-in-picture scenario.

In any case, the scheduling functionality 116 applies the above-identified constraints to assess the presence of conflicts in a schedule. More specifically, a conflict exists when, at any given point in time within a schedule, one or more of the above-identified constraints are not met. Namely, at these points in time, the schedule is attempting to record media programs that consume, in aggregate, more bandwidth than is available.

A conflict may arise due to different kinds of events. In one case, a user may add a new media program to a schedule which creates a conflict with one or more pre-existing media programs in the schedule. Or the user may modify an existing media program in the schedule such that it now interferes with one or more other media programs in the schedule. For example, suppose that the available bandwidth 114 will accommodate the receipt of two HD media programs at the same time. If the user attempts to record three HD media programs at the same time, then the user will have created a conflict (because the communication channel 112 cannot possibly supply the required amount of media information, unless, as will be described below, it is possible to substitute one or more SD media programs in place of one or more HD media program counterparts). In another case, a conflict may arise due to changes in media program guide information. For instance, suppose that a schedule is based on the assumption that a media program will air at time X, but then new media program guide information arrives which changes the airing of the scheduled media program to time Y. This new airing time may create a conflict with one or more other media programs in the schedule. In another case, a conflict may arise due to any other event in the system 100 which consumes the allotted bandwidth 114, therefore making it impossible to receive one or more previously scheduled media programs. For example, assume that a personal computer (not shown) in the household 110 shares the communication channel 112 with the client device 104. The computer may consume bandwidth in interacting with the Internet (or some other entity), thereby reducing the total amount of available bandwidth 114 that can be consumed by the client device 104. Thus, when the computer is in operation, it may create conflicts with programs being concurrently streamed to the client device 104 according to a schedule. In any of the above cases, when a change to any entry in the schedule occurs, it can have a ripple effect which impacts other entries. This is because all of the entries draw from the common pool of bandwidth 114, so that a reduction to this common pool can potentially affect many entries in the schedule.

Later sections will provide a detailed explanation of the manner in which the scheduling functionality 116 addresses conflicts in the schedule. By way of introduction, the scheduling functionality 116 can first identify bandwidth events. As described above, these events define any occurrences which represent a change in bandwidth utilization; these events may or may not cause an over-allocation of bandwidth. The scheduling functionality 116 can then identify different bandwidth versions of the media programs that are scheduled to be recorded, as well as the user's preferences regarding the manner in which these media programs are to be recorded (such as SD, HD, etc.). The scheduling functionality 116 can then establish a schedule that takes into account the bandwidth events, the available bandwidth versions of the media programs, and the user's preferences.

In forming the schedule, the scheduling functionality 116 provides a mechanism for resolving any conflicts that may arise. One exemplary mechanism for resolving the conflicts involves identifying time segments in the schedule for which an over-allocation occurs, enumerating solutions to these conflicts for each time segment, and presenting these solutions to the user via a user interface (UI) presentation. The UI presentation allows the user to resolve the conflict by selecting one or more identified solutions.

A.2. Exemplary System that Includes the Scheduling Functionality (FIG. 1)

A number of features of the system 100 of FIG. 1 were identified in the above introductory section. This section provides a more comprehensive overview of the features in the system 100.

To begin with, the operations center 102 includes acquisition functionality 122 for supplying the media information from one or more sources 124 of such information. The sources 124 can represent any kind of entity which produces or provides media information, such as cable or satellite television providers, one or more Video-On-Demand (VOD) providers, one or more publishing houses of information, one or more library sources, any kind of Internet-enabled repository, and so on. The media information received from these sources 124 can include video, audio, still pictures, and/or other multimedia content. The sources 124 of media programs may provide the media programs (or some subset thereof) in multiple different recording formats, such as SD, HD, PIP (thumbnail size), and so forth. This gives the user the option of viewing and recording the media programs in a preferred recording format.

The acquisition functionality 122 also receives media program guide information from a media program guide source 126. The media program guide source 126 can represent any kind of entity which produces or provides media program guide information, such as a commercial service which compiles and distributes electronic media program guide (EPG) information. The media program guide information typically identifies media events which will occur within an identified span of time, such as a 12 day span. The media program guide information can identify events by providing ID information which represents the events, the times at which the events will begin and end, and the sources (e.g., channels) which will present the events, and so forth.

The acquisition functionality 122 itself can comprise one or more server computers or other functionality dedicated to the task of retrieving the resource information.

The operations center 102 optionally includes an information content store 128 for storing the media information prior to its dissemination to the client devices (104, 106, . . . 108). The information content store 128 can be implemented as one or more databases and associated database management functionality.

The operations center 102 can also include information dissemination functionality 130 for supplying media information to the client devices (104, 106, . . . 108) via a coupling mechanism 132. Different systems may use the information dissemination functionality 130 in different ways. As described above, the system 100 may use the information dissemination functionality 130 to transmit media information to the client device 104, as received from the acquisition functionality 122 (or from some other source), in multicast fashion, unicast fashion, a combination of unicast and multicast fashion, or using some other communication technique.

The information dissemination functionality 130 can be implemented as a collection of server modules (not shown) that facilitate the transmission of media information to the client devices (104, 106, . . . 108). The server modules may provide redundant services, such that any of the server modules can be assigned to provide the same service to any of the client devices (104, 106, . . . 108).

Whatever delivery strategy is used, the operations center 102 can deliver media information to the client devices (104, 106, . . . 108) using a variety of packaging paradigms. In one case, the operations center 102 can supply a sequence of media programs to users in different channels. In this mode, the operations center 102 can present the media programs according to a fixed schedule, in the manner of traditional delivery of channels (although the channels may not have the frequency-specific connotation of traditional analog systems which use physical tuners). In another case, the operations center 102 can supply individual media programs to users at fixed times.

The media information itself can be expressed in any format, including, but not limited to, the MPEG-2 standard, Microsoft Corporation's VC-1 standard, the ISO/ITU H.264 standard, and so forth. The coded media information can be encapsulated into packets using any format, including, but not limited to, the Real Time Transport Protocol (RTP), the Real Time Streaming Protocol (RTSP), and so forth.

The coupling mechanism 132 couples the operations center 102 to the client devices (104, 106, . . . 108). This coupling mechanism 132 can be implemented in different ways to suit different technical and commercial environments. For instance, the coupling mechanism 132 can include any kind of network (or combination of networks), such as a wide area network (e.g., the Internet), an intranet, Digital Subscriber Line (DSL) network infrastructure, point-to-point coupling infrastructure, and so on. The coupling mechanism 132 can use or involve any kind of protocol or combination of protocols. In the case where one or more digital networks are used to disseminate information, the coupling mechanism 132 can include various hardwired and/or wireless links, routers, gateways, name servers, and so on. In the case where DSL infrastructure is used to disseminate information, the coupling mechanism 130 can utilize the services, in part, of telephone coupling infrastructure and DSL processing functionality.

The coupling mechanism 132 permits two-way communication between the operations center 102 and the client devices (104, 106, . . . 108). For example, this two-way communication enables the client device 104 to send schedule selections to the operations center 102 (via path 134), and enables the operations center 102 to send recording instructions and media information to the client device 104 (via path 112 for household 110). The channel 112 connecting the operations center 102 to the client device 104 can be implemented using the same communication mechanism as the channel 134 connecting the client device 104 to the operations center 102; alternatively, these channels can be implemented using different communication mechanisms.

Now referring to the client-side aspects of the system 100, the client devices (104, 106, . . . 108) themselves can be implemented in different ways. Any given client device (104, 106, . . . 108) may represent a television set with integral IP interfacing/processing functionality, a television set with an associated set-top box coupled thereto, a digital video recorder (DVR) device, a rewritable digital video disc (DVD-RW) device, a personal computer having AV decoding functionality, and so forth (as well as any combination of these devices). Or a given client device (104, 106, . . . 108) can take the form of a personal mobile telephone, personal digital assistant (PDA), tablet-type computer device, any kind of wearable computer (e.g., a wristwatch-type computer device), and so forth.

In whatever manner the client devices (104, 106, . . . 108) are implemented, they can comprise a media processing module that is communicatively coupled to a media presentation module. For instance, the client device 104 includes media processing module 136 coupled to media presentation module 138, the client device 106 includes media processing module 140 coupled to media presentation module 142, and the client device 108 includes media processing module 144 coupled to media presentation module 146. The media processing modules (136, 140, . . . 144) may comprise functionality for processing the media information, and the media presentation modules (138, 142, . . . 146) may comprise functionality for presenting the output of the media presentation modules (136, 140, . . . 144). The media processing modules (136, 140, . . . 144) can be integrated with the media presentation modules (138, 142, . . . 146) (e.g., in the case where the media processing modules are integrated into respective IP-ready television sets), or the media processing modules (136, 140, . . . 144) can be separate from (but coupled to) the media presentation modules (138, 142, . . . 146) (e.g., in the case where the media processing modules are housed in respective set-top boxes that are coupled to television sets).

As described above, the representative client device 104 includes the media processing module 136, which, in turn, can comprise optional client-side schedule handling functionality 118. If present, this schedule handling functionality 118 performs whatever tasks are required to cooperate with the scheduling functionality 116 deployed at the operations center 102. Finally, the media processing device 104 also includes the local storage 120. The local store 120 can be used to store streams of media information in response to instructions from the operations center 102, and so forth.

As described above, the system 100 can allocate the scheduling functionality entirely to the OC scheduling functionality 116. Or the system 100 can allocate the scheduling functionality entirely to the client-side scheduling handling functionality 118. Or the system 100 can allocate the scheduling functionality to both the OC scheduling functionality 116 and the client-side schedule handling functionality 118 in distributed fashion. As mentioned above, this disclosure will focus on an implementation in which the OC scheduling functionality 116 is tasked with the responsibility of creating and maintaining schedules, and for resolving conflicts that arise in the schedules. The client-side schedule handling functionality 118 is tasked with the responsibility of interacting with the OC scheduling functionality 116 and for coordinating the storage of media programs in the local store 120 when requested to do so by the OC scheduling functionality 116.

Section A.4 (below) provides additional information regarding one exemplary implementation of the OC scheduling functionality 116.

A.3. Exemplary Client-End Details (FIG. 2)

Figure 2:
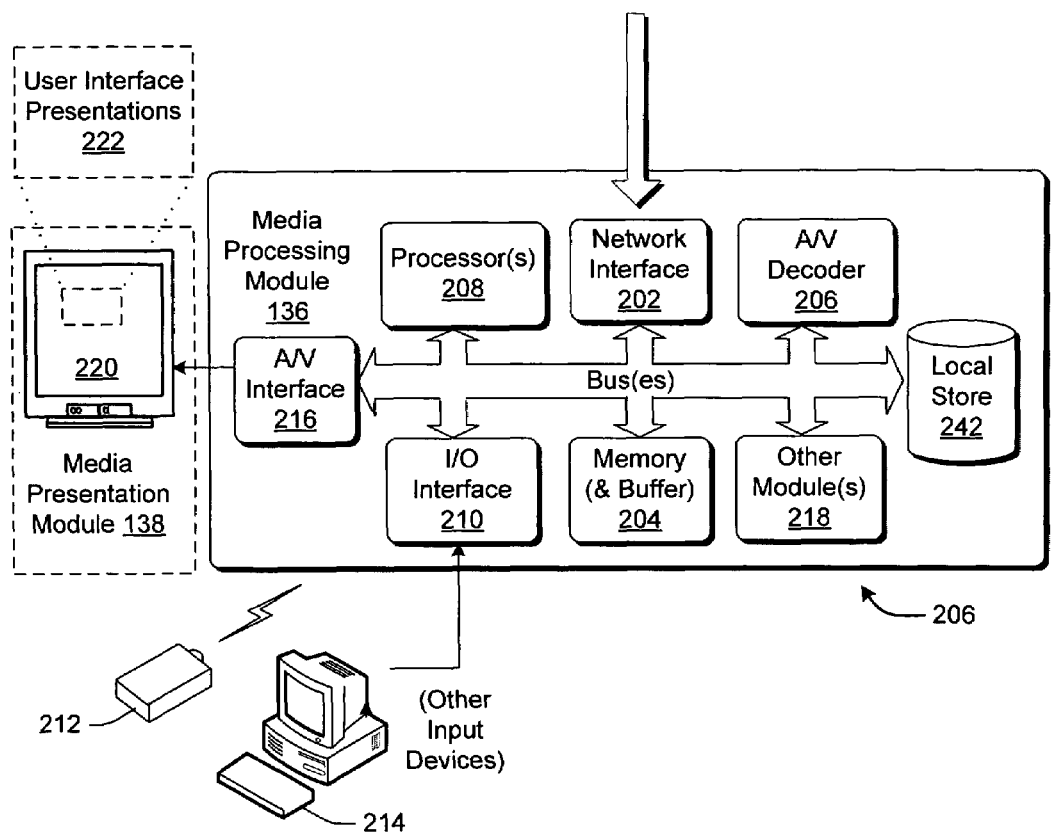
FIG. 2 shows an exemplary client device for use in the system of FIG. 1.

FIG. 2 provides additional details regarding the representative client device 104 (introduced in the context of FIG. 1). The composition of the client device 104 shown in FIG. 2 is merely representative of one of many possible implementations.

The client device 104 comprises the above-identified media processing module 136 coupled to the media presentation module 138. In one case, the media processing module 136 can comprise AV processing functionality combined with the media presentation module 138 in a single integrated device (e.g., a single IP-ready television set). In another case, the media processing module 136 can comprise a separate set-top box or DVR unit (or other kind of separate unit) that communicatively couples to the media presentation module 138 (e.g., a television screen).

The media processing module 228 can include a number of modules for performing its ascribed tasks. To begin with, the media processing module 136 includes a network interface module 202. The network interface module 202 can represent any functionality for receiving media information from the operations center 102 using any coupling mechanism. For example, the network interface module 202 can comprise an Ethernet NIC, a DSL modem, a cable modem, a wireless network interface, or other kind of network interface equipment.

The media processing module 136 also includes memory 204. A portion of the memory 204 can comprise a FIFO-type buffer for storing media information prior to the information being decoded.

The media processing module 136 also includes an audio-visual (AV) decoder 206 for decoding (and decompressing) the received media information into its video and audio components. Decoding comprises ordering packets (if received out of order), extracting media information from the stream of received packets, and also extracting timing information that will govern the playback of the media information. The decoder 206 can also implement the virtual tuner functionality described above, e.g., by including logic for tuning to one or more identified streams of media information using a unicast and/or multicast technique, or some other technique.

The media processing module 136 also includes one or more processors 208 for executing instructions to implement the functionality of the media processing module 228.

The media processing module 136 also includes an I/O interface 210 for interacting with the consumer via one or more input devices (e.g., a remote controller 212, a PC 214, a joy stick (not shown), a touch screen input mechanism (not shown), and so forth).

The media processing module 136 also includes an A/V interface module 216 for providing media information in an appropriate format (e.g., in an appropriate color space) to the media presentation module 220.

The media processing module also includes the above-identified local store 120 for storing media information and/or other information. In general, any combination of storage devices (e.g., memory 204, local store 120, etc.) deployed by the client device 104 can be used to store instructions which implement the client-side schedule handling functionality 118 (if this optional client-side functionality is used).

Finally, the client processing module 136 can include various other modules 218, not specifically enumerated in the figure. For instance, the client processing module 136 can include a graphics compositor for combining a video component of the media information from the AV decoder 206 on a frame-by-frame basis with graphics information. The graphics information may comprise various user interface presentations which are overlaid on the media information.

The media presentation module 138 may comprise any kind of device for presenting AV information, including a CRT-type device, an LCD-type device, and so forth. In any case, the media presentation module 138 defines a display surface 220. The media processing module 136 can present one or more user interface presentations 222 on the display surface 220. For example, a user interface presentation (not shown) can be provided which allows the user to create, review and revise a schedule. This interface can be provided by the scheduling functionality 116 (of the operations center 102) or locally by the client-side schedule handling functionality 118 (or by a combination of such functionality).

A.4. Exemplary Scheduling Functionality Details (FIG. 3)

Figure 3:
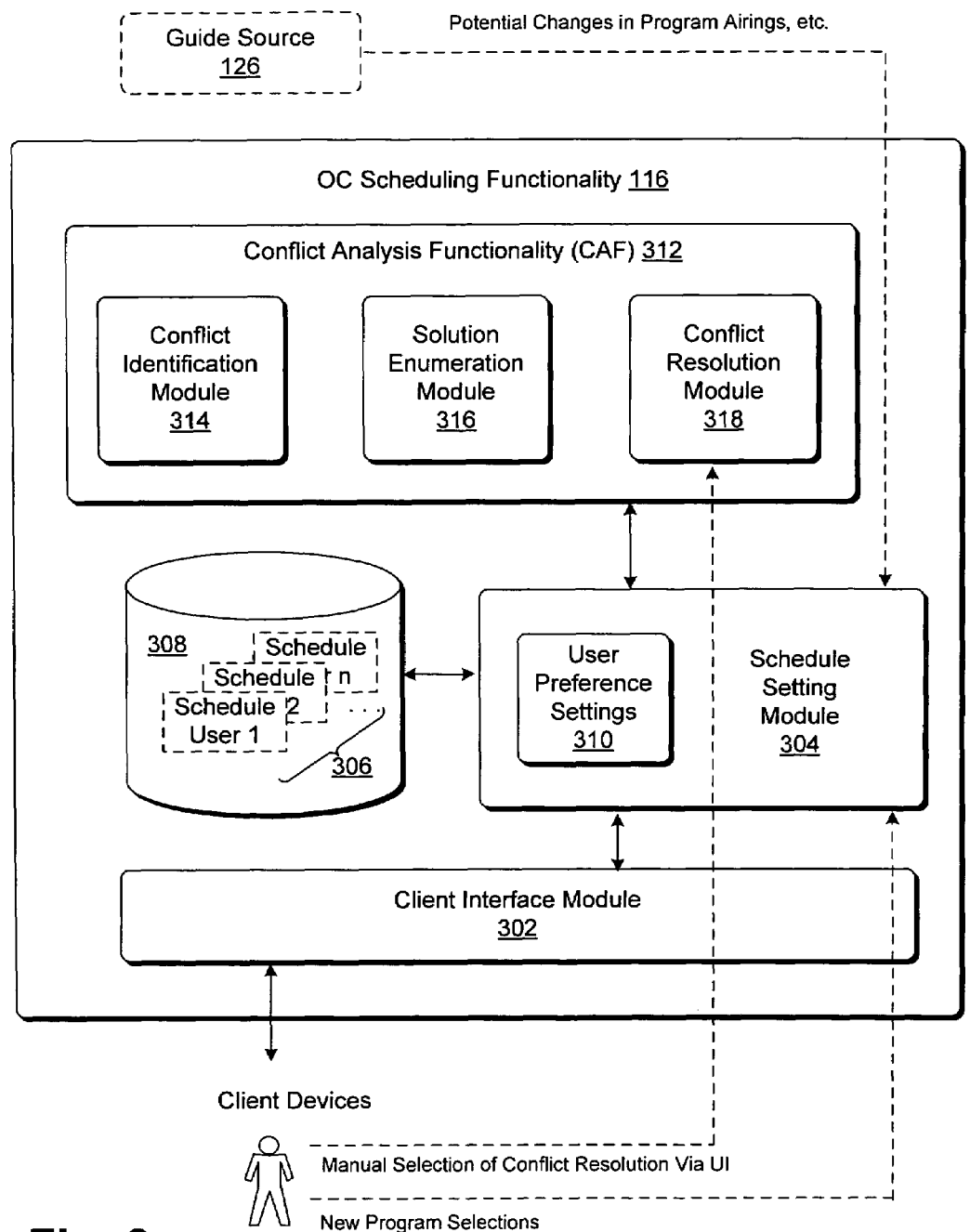
FIG. 3 shows exemplary scheduling functionality for use by the system of FIG. 1.

FIG. 3 shows exemplary details of the scheduling functionality 116. The components shown in FIG. 3 can be located together at a single head-end site or distributed over plural sites. In general, the logic shown in FIG. 3 is exemplary; other functionality can apply different logic modules to implement the basic design principles described herein.

To begin with, the scheduling functionality 116 includes a client interface module 302 for use in interacting with the client devices (104, 106, ... 108) and associated users.

The scheduling functionality 116 also includes a schedule setting module 304 which provides functionality for creating, reviewing and revising schedules 306. The schedule setting module 304 stores these schedules 306 in a schedule store 308. The schedules 306 govern the recording of media information (such as television media programs) for playback at the respective client devices (104, 106, ... 108). (Alternatively, the client devices can store their own respective schedules in their local stores, delegating the processing of these schedules to the head-end scheduling functionality 116.) Each schedule can include one or more entries which describe associated media presentation media programs. For example, an entry may describe a media program by identifying its start time, end time, source (e.g., channel on which it will be presented), and other salient characteristics of the media program.

In creating schedules, the scheduling setting module 304 can access both the guide source information (from the guide source 126) and user preference information 310. The media program guide information specifies what media programs are airing at particular times and on particular channels. The media program guide information may also specify the available formats of the media programs (such as SD, HD, etc.). The user preference information 310 indicates the recording preferences of the users, e.g., regarding the format to be used to record media programs selected by the users. For example, a user of client device 104 may indicate that she prefers that all media programs should be recorded in HD format, except for news media programs (which should be recorded in SD format). If this user then adds a new media program to a schedule, the schedule setting module 304 can be configured to automatically create an entry in the schedule that specifies a media program version having the desired recording format (if that format is available).

As described above, different events may cause a recording conflict. One such event arises when the user adds a new media program to a schedule which happens to conflict with one or more pre-existing media programs (because, for one or more time segments, recording all of the specified media programs would require more bandwidth than is available). Another event arises when the user modifies a pre-existing media program so that it now interferes with one or more other media programs in the schedule. Another event arises when the provider of the media program guide information changes the timing or format of a scheduled media program so that it now conflicts with one or more other media programs in the schedule. Yet additional causes of conflicts are possible.

In the case of a conflict, the scheduling functionality 116 employs conflict analysis functionality 312 to identify and resolve the conflict. The representative conflict analysis functionality 312 includes a number of modules to perform different aspects of its responsibilities.

First, a conflict identification module 314 identifies conflicts in a schedule. In one technique, this module 314 performs this task by dividing a schedule into distinct time segments. Each time segment is distinguished by the fact that it represents a different combination of media consumption events than a temporally preceding time segment. Each time segment also represents a new potential that a conflict is present. For instance, the commencement of a new media program demarcates the start of a new time segment. The end of that time segment may correspond to any subsequent bandwidth event, such as the start or end of any media program. Some of these time segments contain a conflict and others do not. Accordingly, after forming the segments, the conflict identification module 314 can identify those time segments for which there exists an actual conflict (e.g., when the amount of required bandwidth exceeds the amount of available bandwidth 114).

Figure 4A:
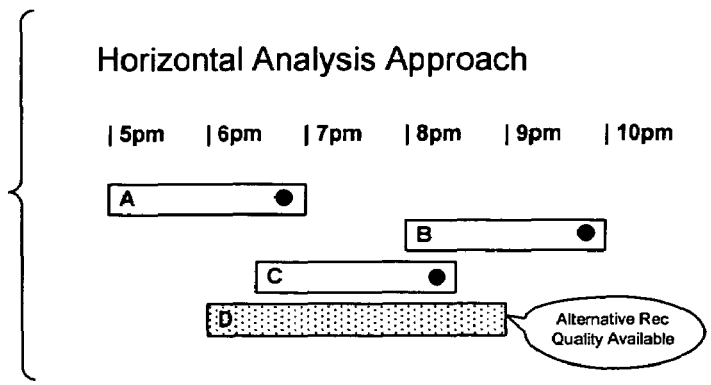
FIGS. 4a and 4b illustrate "horizontal" and "vertical" techniques that the scheduling functionally of FIG. 3 can use to resolve conflicts.
Figure 4B:
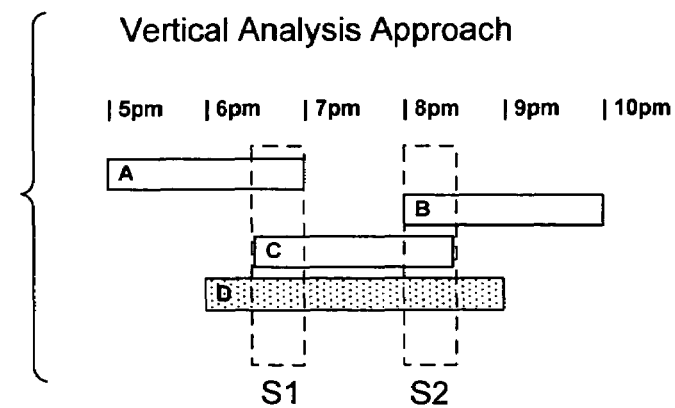

A solution enumeration module 316 enumerates solutions to the conflicts identified by the conflict identification module 314. FIG. 4a represents a horizontal method of resolving conflicts, while FIG. 4b represents a vertical method. In both of these cases, assume that the user first creates a schedule that identifies media programs A, B and C, occurring during the illustrated time spans shown in these figures. At this point in time, there is no conflict because the communication channel 112 includes sufficient bandwidth to record all three of these media programs, even at the junctures in which media program A temporally overlaps media program C, and then, later, when media program B temporally overlaps media program C. However, assume that the user subsequently creates a schedule entry to record media program D. This creates at least one conflict. Assume that the bandwidth 114 is not sufficient to receive media programs A, C and D (at that juncture in which these media programs overlap), and/or is insufficient to receive media programs B, C and D (at the juncture in which these media programs overlap).

The horizontal method shown in FIG. 4a offers complete solutions to all of the conflicts. For example, the possible solutions to the problem might be: (1) do not record media program C; or (2) do not record media programs A and B; or (3) do not record media program D. Selecting any one of these solutions resolves all the conflicts for the entire span of time encompassed by the schedule (in this case, the span defined by 5 pm to 10 pm).

The vertical method shown in FIG. 4b enumerates solutions for each time segment. For instance, assume that the solution enumeration module 316 determines that segments S1 and S2 contain conflicts. This means that, for time segment S1, the available bandwidth 114 is insufficient to record media programs A, C and D, and for time segment S2, the available bandwidth 114 is insufficient to record media programs B, C and D. In this case, the solution enumeration module 316 identifies different sets of solutions for time segment S1 and time segment S2. For example, the solutions to the problem for segment S1 might be: (1) do not record media program A; or (2) do not record media program C; or (3) do not record media program D. In situations where the programs consume the same amount of bandwidth, the vertical approach presents solutions that resolve the conflict by removing single programs (as opposed to solutions that resolve the conflict by removing combinations of multiple programs).

In certain circumstances, the solution enumeration module 316 will determine that one or more media programs do not play a critical role in resolving the conflict. That is, for these media programs, it does not make a difference whether they are recorded or not recorded. In one example, a media program is deemed non-essential because the removal of this media program will not free up enough bandwidth to resolve the conflict. In a more general case, a media program is deemed non-essential when it does not make a necessary contribution to any unique solution. For example, consider the case where one unique solution is to cancel all three SD programs X, Y and Z; in this case, all three of these programs are "essential" and should not be removed from the analysis. On the other hand, consider the case where X and Y are HD programs that are sufficient to resolve the conflict when combined together; if Z is an SD program, Z can not contribute to any unique solution (assuming that neither X+Z nor Y+Z are solutions). If one or more media programs are determined to be non-essential, then these media programs can effectively be removed from the analysis so as not to unnecessarily complicate the user's decision.

Finally, returning to FIG. 3, conflict analysis functionality 312 includes a conflict resolution module 318. The conflict resolution module 318 resolves the conflicts assessed by the conflict identification module 314 using one or more of the solutions determined by the solution enumeration module 316. For example, assume that the conflict arises when the user attempts to add the new media program D to the schedule. At this time, the conflict resolution module 318 can alert the user to the conflict and its possible solutions, and then allow the user to manually select one or more of the solutions. (As will be described below, if a user is not available to manually resolve the conflict, then the conflict analysis functionality 312 can attempt to automatically resolve the conflict based on various rules.)

Consider, for example, the case where the horizontal method is used to enumerate solutions. In this case, the conflict resolution module 318 can successively display different solutions to the user (in which each solutions removes all conflicts in the schedule). For example, the conflict resolution module 318 can first ask the user whether they wish to forego the recording of media program C. If the user declines this solution, the conflict resolution module 318 can ask the user whether they wish to forego the recordation of both media programs A and B. If the user declines this solution, the conflict resolution module 318 can ask the user whether they wish to forego the recordation of media program D, and so forth.

The vertical method can apply a similar approach to resolving conflicts, that is, by successively stepping the user through different solutions. But in this case, the conflict resolution module 318 addresses each conflicted segment in turn, asking the user to select a solution for each segment. In one exemplary case, the user's selection for a first segment (e.g., to forego the recordation of a particular media program for that segment), will completely eliminate that media program from the schedule. This may or may not have the effect of changing the conflict situation for a later-occurring segment (that is, by also removing the conflict for this later segment). Alternatively, the conflict resolution module 318 can be configured such that the user's instruction to remove a media program for a conflicting segment will only remove that part of the media program in that segment, potentially resulting in the recordation of the remainder of that media program in later segments. The user might desire this option because the user is still interested in recording part of the conflicted media program, e.g., where the user wishes to watch the last quarter of a football game, even though they cannot watch the first parts of the game.

Different user interface techniques can be used to facilitate the user's selection of solutions. In one technique, the conflict resolution module 318 presents textual information which identifies the possible solutions, in conjunction with a graphical time bar presentation that represents the overlapping media programs (e.g., in the manner of the presentations shown in FIGS. 4a and 4b). The user can then click on the textual information which corresponds to the desired solution or solutions. In another case, the conflict resolution module 318 can allow the user to interact with the graphical time bar presentation itself. For example, the conflict resolution module 318 can provide visual indicia on the time bars (such as colored dots or other symbols) which represent a set of media programs that can be recorded within the limitations of the available bandwidth 114.

For example, consider first the case of the horizontal solution. The conflict resolution module 318 can initially present the time bars shown in FIG. 4a with red dots on the time bars for media program A, media program B, and media program D—this being one of the solutions. This means that, if the user accepts this solution, then media programs A, B and D will be recorded, but not media program C. If the user wants C to record, the conflict resolution module 318 can permit the user to click on the time bar for media program C. This will cause a red dot to be displayed on media program C, and possibly the red dots to be removed from media programs A and B. If this solution is not satisfactory, the user might then click on either the time bars for media programs A and B, which might cause red dots to again be displayed on these time bars, but may cause the removal of the red dot from the time bar for media program D. In this manner, the user can cycle through the possible solutions. The graphical presentation of time bars and the associated recording indicia allows the user to gain easy understanding of the possible recording permutations. The same graphical paradigm can be employed to review and select solutions for the vertical technique. But in this case, the conflict resolution module 318 can graphically sequence through the different solutions for each time segment in turn.

Logic can be added to the above-described solution-cycling mechanism to ensure that the conflict resolution module 318 visits each possible solution before repeating a solution. This may be useful feature to prevent the conflict resolution module 318 from "ping-ponging" between two solutions. For example, if the user clicks on the time bar for media program C to add a colored dot to time bar C, it might be appropriate to remove the color dot from time bar D, leaving the color dots for time bars A and B. But if the user then clicks on time bar D, it is not instructive to again remove the colored dot from time bar C (because the user just indicated that this solution was unsatisfactory). Rather, it would be more constructive to remove the colored dots from time bars A and B, leaving the colored dots on time bars C and D. This would ensure that the conflict resolution module 318 completely sequences through the available options. This feature can be implemented by maintain a list of possible solutions, and ensuring that no solution is repeated until all of the options have been visited on the list.

Other features can be used to improve the above-described UI experience. For example, the conflict resolution module 318 can order the solutions in the list, for example, by ordering the solutions according to their potential desirability. Different rules can be used to assess desirability. For example, one rule might be to sequence through all solutions that involve the removal of only one media program before moving on to solutions that involve the removal of multiple media programs. For example, in the in the vertical approach, consider the case where programs A, B, and C are already scheduled. Programs A and B consume 1 unit of bandwidth and program C consumes 2 units of bandwidth. Assume that there is next an attempt to record a program D that consumes 2 units of bandwidth. One solution is to remove programs A and B; another solution is to remove program C. The above-described solution-ordering rule might prompt the user to consider removing program C prior to removing both programs A and B (under the assumption that removing one program is less disruptive than removing two programs). Another rule might rely on selection criteria that the user expressly defines; for example, the user might indicate that she values sports media programs higher than news media programs; thus, if there is a choice between these two types of media programs, the conflict resolution module 318 will first display the solution in which the news media program is removed. These are merely illustrative rules; other applications can adopt different rules.

According to another feature, one or more the media programs in the schedule might have airings that have different recording quality. For example, assume that the user initial indicates that she wants to record a sports media program in HD mode. However, assume that the user later adds another media program to the schedule which conflicts with this sports media program. The conflict resolution module 318 can be configured to alert the user to the availability of the sports media program in a different format, such as SD, in the event that selection of this format will remedy the conflict. The availability of alternative recording formats can be communicated to the user in different ways. For example, as shown in FIG. 4a, the conflict resolution module 318 can add visual indicia (e.g., a message bubble) to a time bar (associated with a particular media program) which indicates that a lower quality recording is available for this media program that might remedy the conflict. The user can click on the indicia to invoke the lower quality recording.

According to another feature, if one or more media programs do not play a part in the solution (because the removal of these media programs cannot possibly resolve the conflict) then the conflict resolution module 318 can eliminate these media programs so that they do not appear on the UI presentation. This is beneficial because the removal of these media programs produces a less cluttered UI presentation, and potentially makes the UI presentation easier to understand, facilitating the user's decision-making.

According to another feature, a provider can add "artificial" constraints which govern how the available bandwidth 114 can be allocated to virtual tuners. That is, as stated above, the virtual tuner functionality should normally be able to carve up the available bandwidth into any number of streams, providing that the aggregate of the consumed bandwidth does not exceed the available bandwidth 114. But a provider may wish to specify that only a maximum number of virtual tuners be deployed, such as 2 HD virtual tuners and 2 SD virtual tuners, and so forth. If applicable, the conflict analysis functionality 312 can takes these "artificial" constraints into account in its conflict resolution technique.

Still other features and variations of the scheduling functionality 116 are possible. Copending and commonly assigned U.S. patent application Ser. No. 10/918,847, entitled "Video Recording Conflict Management and User interface," naming the inventors of Aaron J. DeYonker, Peter J. Potrebic, Thomas H. Taylor, and Jeffery C. Fong describes additional user interface functionality and other features that can be applied to the case of scheduling of programs in a virtual tuning environment. This application is incorporated by reference herein in its entirety.

As a final topic, other conflicts may be triggered by actions that are not in direct response to the actions of the user. For example, the media program guide information may be periodically updated. If new media program guide information indicates that a scheduled entry's time slot has changed, or its recording quality has changed, etc., then the conflict analysis functionality 312 can come into play to attempt to resolve any conflicts that these changes may create. In one case, if possible, the conflict analysis functionality 312 can flag the conflict for later resolution by the user when she next interacts with her client device 104. If this is not possible, then the conflict analysis functionality 312 can attempt to automatically resolve the conflict. This can be performed by automatically selecting a solution that is determined to be best based on the exemplary rules identified above (in which solutions are ordered based on their assessed desirability). For example, one rule might be to automatically downgrade the recording quality for one or more programs from HD to SD to resolve the conflict (even though it might be the user's normal preference to record programs in HD).

B. Exemplary Method of Operation (FIGS. 5-10)

The remaining figures describe the operation of the scheduling functionality 116 flowchart form, in conjunction with specific examples which clarify the operation of the flowcharts. To facilitate discussion, certain operations are described as constituting distinct steps performed in a certain order. Such implementations are exemplary and non-limiting. Certain steps described herein can be grouped together and performed in a single operation, and certain steps can be performed in an order that differs from the order employed in the example set forth in this disclosure. As many functions described in these flowcharts have already been explained in prior sections, this section will serve primarily as a review of those functions.

B.1. Method of Operation of the Scheduling Functionality

Figure 5:
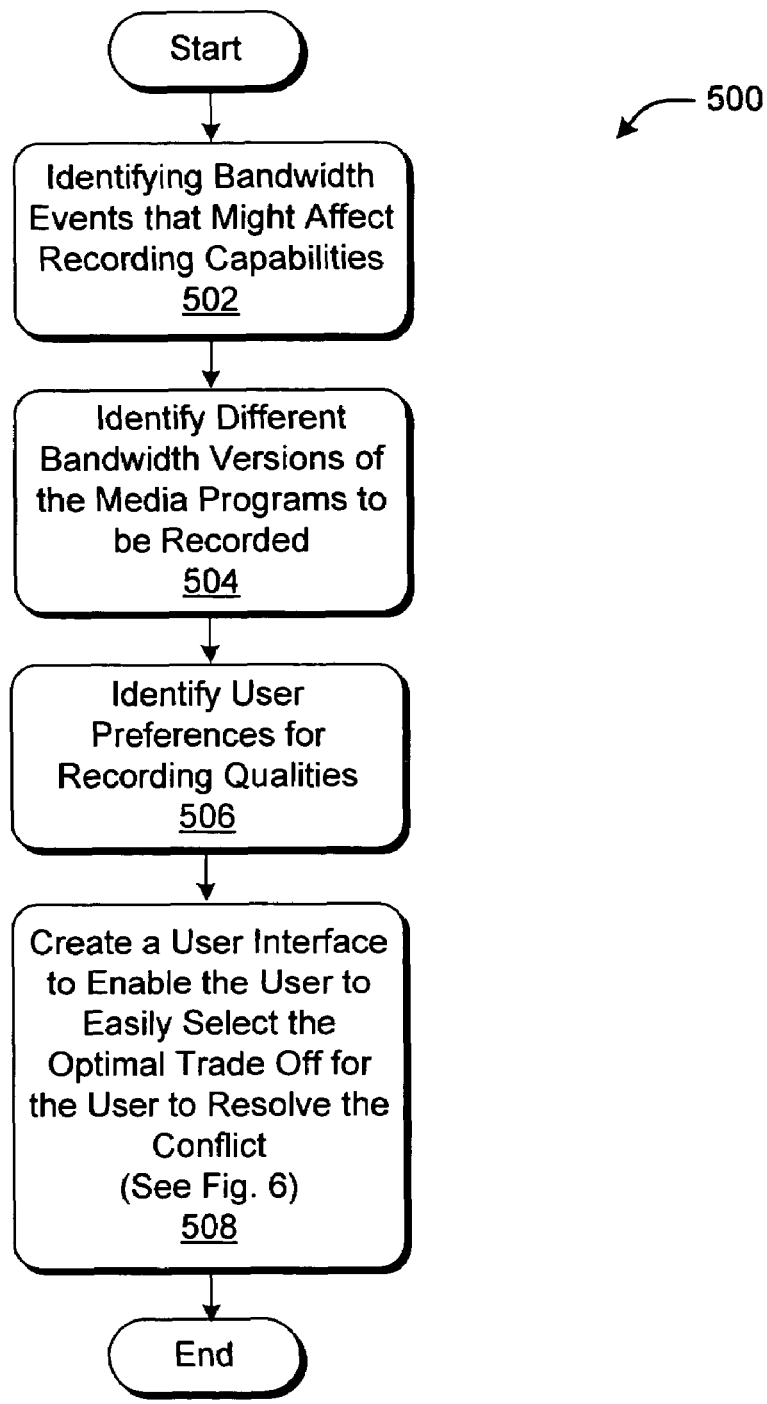
FIGS. 5 and 6 together show a procedure which explains an exemplary manner of operation of the system of FIG. 1.
Figure 6:
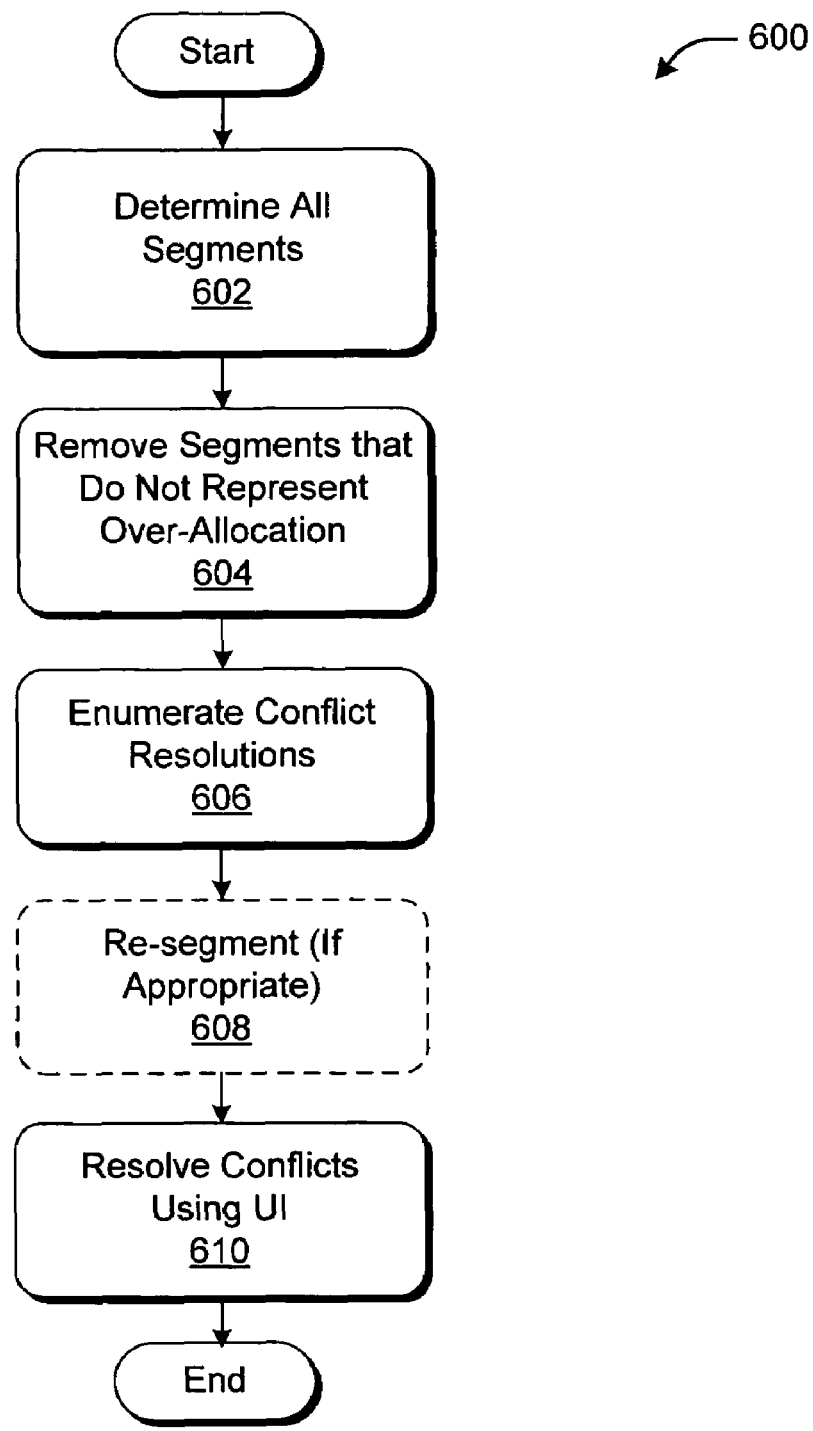

FIGS. 5 and 6

Procedure 500 shown in FIG. 5 provides an overview of an exemplary method of operation of the scheduling functionality 116 of FIGS. 1 and 3.

In step 502, the scheduling functionality 116 identifies one or more bandwidth events that might present schedule conflicts. As previously described, a first kind of event represents the addition of a new media program to a schedule, or the modification of an existing media event (e.g., by altering its recording quality). A second kind of event represents a change in media program guide information (or other event not directly caused by the actions of the user), which creates a conflict.

In step 504, the scheduling functionality 116 identifies different bandwidth versions of a new media program that is being added to the schedule (if, in fact, the bandwidth event assessed in step 502 corresponds to a new media program being added to the schedule). Step 504 can optionally also involve determining different bandwidth versions of pre-existing media programs in the schedules; this is useful information in the case that it is appropriate to change the recording quality of one or more pre-existing media programs in the schedule to accommodate the introduction of a new media program. Exemplary recording qualities comprise SD, HD, PIP, etc.

In step 506, the scheduling functionality 116 identifies user preferences regarding recording quality. For example, the user may indicate that she prefers that all media programs of a certain kind be recorded in SD format, HD format, etc.

In step 508, the scheduling functionality 116 processes the results of the preceding steps to update the schedule, e.g., by adding a new media program to the schedule have the desired recording quality. Step 508 also assesses whether the bandwidth event identified in step 502 creates a conflict that needs to be resolved. If not, then the scheduling functionality 116 stores the updated schedule in the store 308. If a conflict occurs, however, then the processing advances to the procedure 600 of FIG. 6. Procedure 600 provides one exemplary method for resolving the conflict using the above-described vertical technique. By way of overview, this technique involves dividing the schedule into its component time segments, and then addressing the conflict (or conflicts) on a segment by segment basis.

More specifically, in step 602, the scheduling functionality 116 begins by breaking the schedule containing conflicts into its components time segments. Each time segment represents a different combination of bandwidth events than its immediately preceding time segment. For example, the beginning of a new media program will mark the beginning of a new time segment. The ending of any media program or the beginning of any media program will mark the end of that time segment. Some of the thus-created time segments will contain conflicts, while others may not.

In step 604, the scheduling functionality 116 removes time segments that do not contain any conflicts, leaving only time segments that contain a conflict. In these conflicting time segments, there is an over-allocation of bandwidth, meaning that there is not enough bandwidth to record all of the media programs that user wishes to record.

In step 606, the scheduling functionality 116 can enumerate all of the solutions to the conflict for reach time segment in which a conflict occurs. That is, for each time segment, the scheduling functionality 116 identifies a set of solutions, any of which will solve the conflict for that segment.

In step 608, the scheduling functionality 116 reduces the complexity of the time segments (if possible) to reflect the outcome of step 606. For example, assume that it is determined in step 606 that one or more media programs cannot possibly contribute to a solution. In one example, this is because removing these media programs does not free up enough bandwidth to resolve the conflict. In this case, step 608 can remove the non-consequential media programs from the schedule and re-determine the time segments. This may have the effect of coalescing one or more previously defined time segments.

In step 610, the scheduling functionality 116 resolves the conflicts using the UI techniques described above. For example, the scheduling functionality 116 can allow the user to graphically cycle through the possible solutions and select a desired resolution of the conflict for each time segment in turn.

B.2. Illustrative Examples

FIGS. 7-10

The remaining figures present examples of the procedures set forth in FIGS. 5 and 6.

Figure 7:
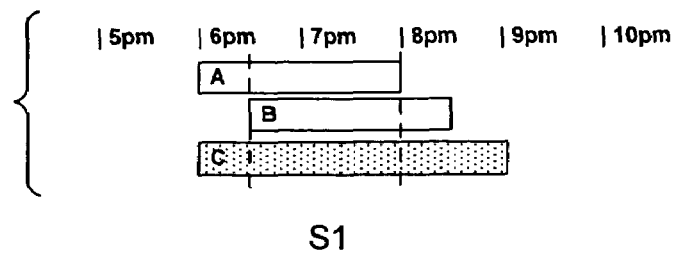
FIGS. 7, 8a-8c, 9a-9d, 10a and 10b illustrate the application of the system of FIG. 1 to the resolution of specific instances of schedule conflicts.

Consider first the introductory case of FIG. 7. In this case, assume that the total allocated bandwidth 114 is 3 units. Assume that an SD stream consumes 1 unit of bandwidth and an HD stream consumes 2 units of bandwidth. (These unitless bandwidth values serve a merely tutorial purpose in this section; that is, these values are not significant in and of themselves.) Assume further that the user wants to record an SD media program A, an HD media program B, and finally, a new HD media program C. There is a conflict because, in those portions in which media programs A, B and C overlap, a total of 1+2+2=5 units of bandwidth is required, whereas there are only 3 available units.

In this case, while media program A overlaps with media program C, media program A is not part of any solution to the conflict. This is because canceling A does not free enough bandwidth to resolve the conflict. Or more generally, removing program A does not form a necessary component of any unique solution (for example, it is possible to resolve the conflict by canceling programs A and B, but removing program B will suffice by itself, making the removal of program A superfluous). Therefore, conflict enumeration results in two possible solutions: (1) do not record B (allowing C to record); or (2) do not record the new media program C (thus maintaining the status quo).

In a second scenario, also with reference to the same FIG. 7, assume that media program A is an SD media program, media program B is an HD media program, and now, however, media program C is an SD media program.

In this case, since the new request is an SD media program, canceling either media program A or media program B will free enough bandwidth, allowing media program C to record. Therefore, conflict solution enumeration results in three possible solutions: (1) do not record media program A; or (2) do not record media program B; or (3) do not record the new media program C (thus maintaining the status quo).

Figure 8A:
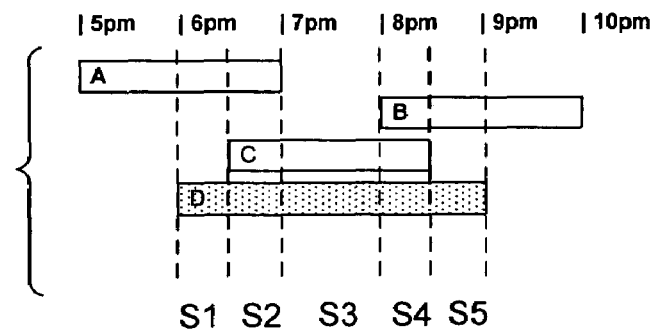
Figure 8B:
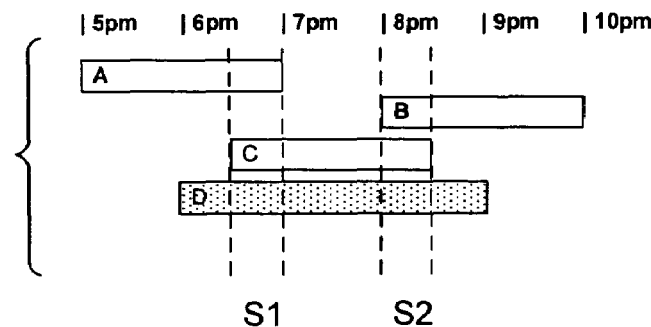
Figure 8C:
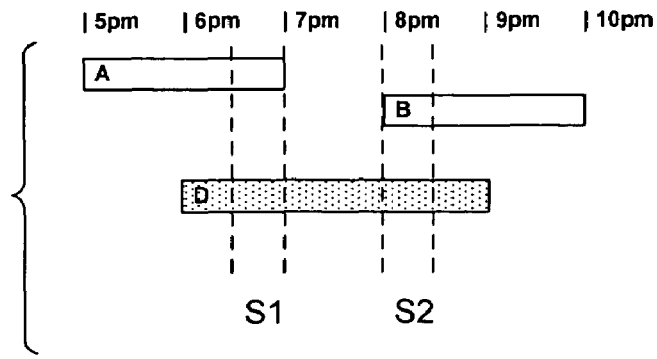

The scenario of FIG. 8 (comprising FIGS. 8a, 8b and 8c) illustrates a more complex case, showing, step-by-step, the analysis performed according to the procedure 600 of FIG. 6. In this example, again assume that the system provides 3 units of bandwidth 114, and that an SD media program consumes 1 unit of bandwidth and an HD 19 media program consumes 2 units of bandwidth. In this example, media programs A and B are HD streams, media program C is an SD stream, and the new media program, D, is an HD stream.

Step 602 involves determining all of the time segments, which yields the result shown in FIG. 8a. Each segment represents a potential for a new conflict, but each time segment may not actually contain a conflict.

Step 604 involves removing segments that do not represent over-allocation of bandwidth, and which thus do not present a conflict. This yields the result shown in FIG. 8b. As indicated there, out of five segments shown in FIG. 8a, only two (segments S1 and S2) include an actual assessed conflict. The scheduling functionality 116 can rely on the above-identified constraint equations (defined in section A.1) to determine whether there is an over-allocation in each time segment.

Step 606 involves enumerating possible solutions for each time segment, thus producing a set of one or more solutions for each time segment. For instance, for segment S1, there are two solutions: (1) not recording media program A; or (2) not recording media program D. For time segment S2, there are also just two solutions: (1) not recording media program B; or not recording media program D. In this particular scenario, whether or not media program C is recorded does not matter, because removal of this media program does not resolve the conflict. For this reason, as indicated in FIG. 8c, media program C can effectively be removed from the UI that is presented to the user.

Finally, step 610 involves resolving the conflict in the manner described above. This can involve graphically sequencing through the solutions for each slice in turn in the manner described above.

FIG. 9 (comprising FIGS. 9a, 9b, 9c and 9d) shows another example. In this case, again assume that the system provides a total of 3 units of bandwidth 114, and that an SD stream consumes 1 unit of bandwidth and an HD stream consumes 2 units of bandwidth. Here, media programs A and B are SD streams, C is an HD stream, and the new media program, D, is an HD stream.

The procedure 600 shown in FIG. 6 is again applied. In step 602, the scheduling functionality 116 determines all time segments which may present a new conflict. This yields the five time segments shown in FIG. 9a.

Step 604 involves removing time segments that do not represent over-allocation (and thus do not represent a conflict). This produces the result shown in FIG. 9b, in which three time segments (S1, S2 and S3) remain in the schedule.

Step 606 involves enumerating solutions for each time segment in which there is a conflict. In this case, media programs A and B do not contribute to any solutions, because removing these media programs will not remove any of the assessed conflicts. Thus, media programs A and B can be removed from the UI, to produce the time bar presentation shown in FIG. 9c. The possible solutions for each of the three time segments are: (1) do not record media program C; or (2) do not record media program D.

Figure 9A:
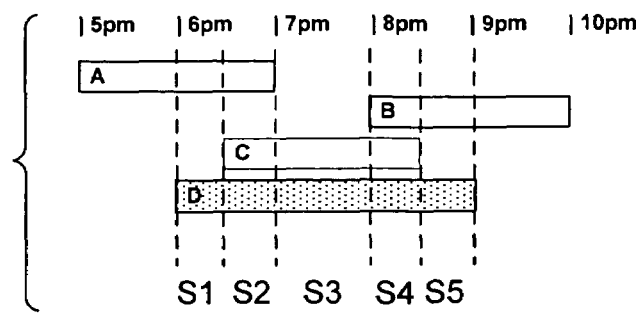
Figure 9B:
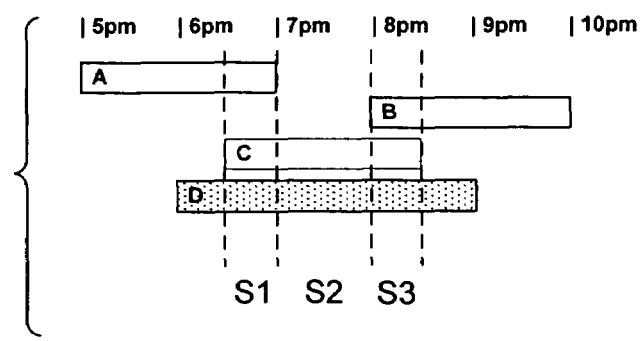
Figure 9C:
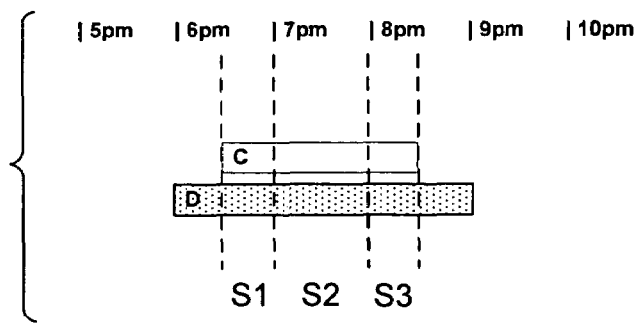
Figure 9D:
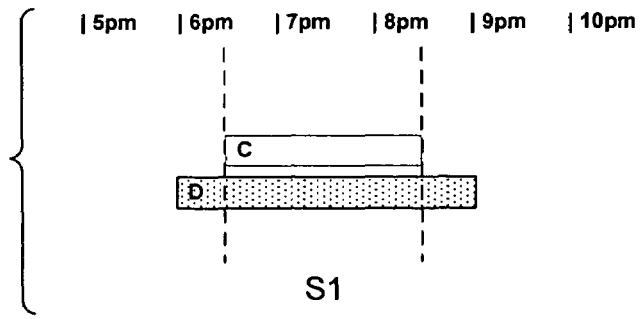

Step 608 involves re-segmenting the UI in response to the results of step 606. Namely, in step 606, the analysis discarded media programs A and B. This allows the scheduling functionality 116 to coalesce the three time segments into a single time segment, as shown in FIG. 9d.

Step 610 involves using the UI to resolve the conflict in the manner described above. In this case, the user can be presented with the simplified UI presentation shown in FIG. 9d, which facilitates the user's decision-making.

Figure 10A:
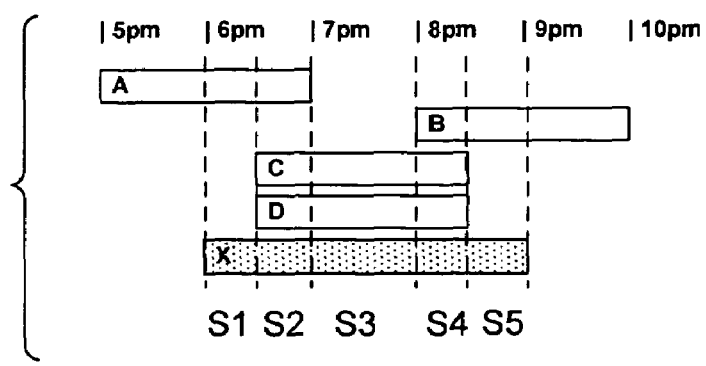
Figure 10B:
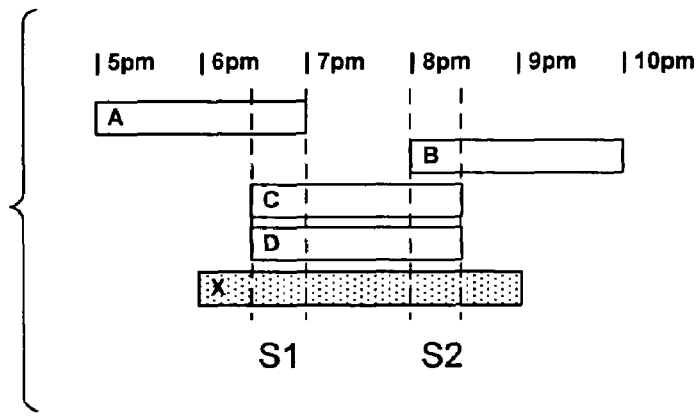

FIG. 10 (comprising FIGS. 10a and 10b) shows a final example. In this case, assume that the system provides a total of 4 units of bandwidth 114, and that an SD 19 stream consumes 1 units of bandwidth an HD stream consumes 2 units of bandwidth. Media programs A and B are HD streams, while media programs C and D are SD streams. The new media program X is an HD stream.

The procedure 600 shown in FIG. 6 is once again applied. In step 602, the scheduling functionality 116 determines all time segments in which a conflict may occur. This produces the five time segments shown in FIG. 10a.

In step 604, the scheduling functionality 116 removes time segments that do not present any conflicts. This produces the result shown in FIG. 10b. The remaining time segments, S1 and S2, include an over-allocation of bandwidth.

In step 606, the scheduling functionality 116 enumerates the possible solutions for each of the time segments S1 and S2. In time segment S1, the solutions include: (1) do not record media program A; or (2) do not media programs C and D; or (3) do not record media program X. A similar solution applies to time segment S2 (but with a solution that proposes the omission of media program B, rather than A).

In step 610, the scheduling functionality 116 solicits a resolution of the assessed conflicts from the user using the UI-based approach described above.

In closing, a number of features were described herein by first identifying exemplary problems that these features can address. This manner of explication does not constitute an admission that others have appreciated and/or articulated the problems in the manner specified herein. Appreciation and articulation of the problems present in the relevant arts is to be understood as part of the present invention.

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A method of resolving schedule conflicts affecting a client device that employs virtual tuner functionality, comprising:

receiving, at an operations center, from the client device, scheduling instructions to create a schedule to record plural media programs;

establishing a schedule for the client device to receive for recording the plural media programs at the client device by receiving transmission of the plural media programs from the operations center over a communication channel at a specified timing, wherein the schedule specifies that the plural media programs will be transmitted over the network in a specified first format version to the client device at the specified timing for recording at the client device;

identifying at least one conflict in the schedule caused by at least one bandwidth event by taking into account whether an amount of bandwidth to be consumed by each of said plural media programs in the schedule would exceed a total amount of bandwidth available to the client device to receive the plural media programs over the communication channel;

as a result of identifying the at least one conflict in the schedule, determining from a media program guide source that a second format version of one or more of the media programs is available to be transmitted to the client device for recording at the specified timing, wherein the second format version of the one or more media programs will consume a lower amount of bandwidth of the communication channel than the specified first format version of the media program;

enumerating at least one solution to the at least one conflict, wherein the solution includes replacing one or more of the media programs scheduled to be received over the over the communication channel for recording in the specified first format version with the one or more media programs in the second format version that consumes a lower amount of the bandwidth of the communication channel than the specified first format version; and resolving said at least one conflict based on said at least one solution.

2. The method of claim 1, wherein said at least one bandwidth event comprises a user's selection of a new media program.

3. The method of claim 1, wherein said at least one bandwidth event comprises a change in media program guide information which affects the schedule.

4. The method of claim 1, wherein the identifying of said at least one conflict comprises:

partitioning the schedule into at least one candidate time segment in which a conflict may exist; and determining at least one conflicting time segment from said at least one candidate time segment for which an actual conflict exists.

5. The method of claim 4, wherein the enumerating of said at least one solution comprises enumerating at least one solution that resolves the conflict for all of the time segments in said at least one conflicting time segment.

6. The method of claim 4, wherein the enumerating of said at least one solution comprises enumerating at least one solution that resolves the conflict for each particular time segment in turn in said at least one conflicting time segment.

7. The method of claim 1, further comprising automatically downgrading recording quality of one or more of the media programs from the first format to the second format to resolve the conflict by changing the schedule at the operation center from scheduled reception over the communication channel of the one or more media programs in the first format to scheduled reception over the communication channel of corresponding one or more media programs in the second format.

8. The method of claim 1, wherein the resolving of said at least one conflict comprises:

providing a user interface presentation to a user which solicits input from the user to resolve said at least one conflict; and receiving the input from the user to resolve said at least one conflict.

9. The method of claim 8, wherein the user interface presentation displays conflicting media programs using respective time bars, and wherein the receiving of the input comprises receiving the user's selection of one or more of the time bars.

10. One or more machine-readable storage media containing machine-readable instructions for implementing the method of claim 1.

11. A method for resolving schedule conflicts affecting a client device that employs virtual tuner functionality, comprising:

placing an operations center into communication with a plurality of the client devices, wherein the operations center includes a scheduling module for receiving user preference settings from users of the client devices;

establishing, at the operations center, a plurality of schedules, each schedule corresponding to one of the client devices, wherein each schedule specifies plural media programs to be received over a communication channel for recording by the corresponding client device, wherein one or more of the media programs is scheduled to be received over the communication channel in a high definition format version that requires a first amount of bandwidth;

identifying at least one conflict in a first one of the schedules by taking into account whether an amount of bandwidth of the communication channel to be consumed by each of said plural media programs in the first schedule would exceed a total amount of bandwidth of the communication channel available to the client device to receive the plural media programs;

in response to identifying the at least one conflict, determining the scheduling module at the operations center by referring to a media program guide source that one or more of the media programs scheduled to be transmitted in the high definition format version is available in a standard definition format version that requires a second amount of bandwidth that is less than the first amount of bandwidth required for transmitting the one or more media programs from the operations center to the client device;

determining that replacing the one or more of the media programs in the high definition format with a standard definition format version would resolve the at least one conflict by reducing the bandwidth required for transmitting the plural media programs from the operations center to less than or equal to the total amount of the bandwidth of the communication channel available to the client device to receive the plural media programs; and presenting at least one solution to the user of the first client device, wherein the scheduling module at the operations center is configured to identify the user's preferences regarding a quality at which the one or more media programs are scheduled to be received over the communication channel, and when the user's preference is for receiving programs in the high definition format, the at least one solution includes selecting at least one of the media programs for receiving over the communication channel at a lower bandwidth requirement by changing scheduled reception and recording from the high definition format version to the standard definition format version for resolving said at least one conflict.

12. The method according to claim 11, further comprising identifying said at least one conflict by:

partitioning the schedule into at least one candidate time segment in which a conflict may exist; and determining at least one conflicting time segment from said at least one candidate time segment for which an actual conflict exists.

13. The method according to claim 11 further comprising presenting said at least one solution by enumerating at least one solution that resolves the conflict for all of the time segments in said at least one conflicting time segment.

14. The method according to claim 11 further comprising presenting said at least one solution by enumerating at least one solution that resolves the conflict for each particular time segment in turn in said at least one conflicting time segment.

15. The method according to claim 11 further comprising eliminating, from a user interface presented to the user, display of the media programs whose removal from the schedule would not contribute to resolution of the at least one conflict.

16. The method according to claim 11 further comprising:
providing a user interface presentation to the user which solicits input from the user to resolve said at least one conflict; and receiving the input from the user to resolve said at least one conflict.

17. One or more machine-readable media storage containing machine-readable instructions for implementing the method of claim 11.

18. A system for scheduling the processing of media programs for a client device that employs virtual tuner functionality, comprising:

a head end operations center including a processing device configure by execution of program code stored in one or more computer readable memory devices to implement a schedule setting module for receiving scheduling instructions from the client device to create a schedule for the recording device to receive and record a set of media programs, wherein the schedule setting module identifies at least one bandwidth event that affects transmission of the set of the media programs to the client device and the recordation of the set of the media programs by the client device by taking into account whether an amount of bandwidth to be consumed by transmitting the set of media programs over a communication channel would exceed a total amount of bandwidth of the communication channel available to the client device to receive the set of media programs, the client device including a media processing module for receiving and recording the set of media programs transmitted via a network from the operations center;

wherein the schedule setting module at the operations center is configured to identify different bandwidth versions of at least one media program in the set of media programs by accessing a program guide source;

wherein the schedule setting module is configured to identify a users preferences regarding quality at which media programs are received and recorded corresponding to available bandwidth versions of the media programs;

wherein the schedule setting module is configured to provide a schedule to the client device which governs the reception and recording of said set of media programs based on the identified bandwidth versions and user's preferences, wherein the schedule setting module is configured to resolve at least one conflict in the schedule caused by the bandwidth event by automatically selecting a lower bandwidth version of one or more of the media programs in the set of media programs in place of a higher bandwidth version of one or more of the media programs requiring a first bandwidth for transmission, by automatically switching to a lower bandwidth version of the one or more media programs, requiring a second lower bandwidth for transmission over the communication channel to the client device.

19. The system of claim 18, wherein the schedule setting module at the operations center is configured to resolve said at least one conflict by:

identifying said at least one conflict in the schedule caused by said least one bandwidth event;

enumerating at least one solution to said at least one conflict, wherein said at least one solution takes into account: (a) a total amount of bandwidth available to the client device to receive media programs; and (b) an amount of bandwidth consumed by transmission of each of said plural media programs in the schedule; and resolving said at least one conflict based on said at least one solution by identifying that the user's preference is for higher bandwidth versions of the media programs, determining that a lower bandwidth version is available for one or more of the media programs, and automatically downgrading from the first bandwidth version of the one or more of the programs to the lower second bandwidth version to resolve the conflict.

20. The system of claim 18, wherein the media program guide information specifies available bandwidth versions of media programs available.

* * * * *